US007615810B2

(12) United States Patent
Murade

(10) Patent No.: US 7,615,810 B2
(45) Date of Patent: Nov. 10, 2009

(54) ELECTRO-OPTICAL DEVICE, METHOD OF MANUFACTURING ELECTRO-OPTICAL DEVICE, AND ELECTRONIC APPARATUS

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 348 days.

(21) Appl. No.: 11/348,489

(22) Filed: Feb. 7, 2006

(65) Prior Publication Data

US 2006/0193170 A1  Aug. 31, 2006

(30) Foreign Application Priority Data

Feb. 17, 2005  (JP)  ............... 2005-040117
Dec. 19, 2005  (JP)  ............... 2005-364462

(51) Int. Cl.
*G11C 11/34* (2006.01)

(52) U.S. Cl. ............... 257/257; 257/254; 257/253; 257/258; 257/362; 257/E27.002; 257/E27.019; 257/E27.009; 365/185; 313/586; 313/582

(58) Field of Classification Search ............... 257/359, 257/253, 254, 257, 258, 362, E27.002, E27.009, 257/E27.019; 365/185; 438/17; 313/585, 313/582

See application file for complete search history.

(56) References Cited

U.S. PATENT DOCUMENTS 6,219,113 B1 *  4/2001  Takahara .................. 349/42
6,774,973 B2      8/2004  Ko
6,859,247 B2      2/2005  Murade et al.

2003/0180975 A1 *  9/2003  Fujita ......................... 438/17
2003/0222838 A1 * 12/2003  Iida et al. ................... 345/87
2004/0217778 A1 * 11/2004  Miyake ...................... 326/83

FOREIGN PATENT DOCUMENTS

| JP | 06-308535    | 11/1994 |
| JP | A 10-253990  | 9/1998  |
| JP | 2002-108247  | 4/2002  |
| JP | 2002-196346  | 7/2002  |
| JP | 2004-004993  | 1/2004  |
| JP | A 2004-146717| 5/2004  |
| KR | 2003-0053179 A | 6/2003 |

* cited by examiner

*Primary Examiner*—Wael Fahmy
*Assistant Examiner*—Marc Armand
(74) *Attorney, Agent, or Firm*—Oliff & Berridge, PLC

(57) ABSTRACT

An electro-optical device includes first and second substrates that are bonded to each other, the first substrate having an extended portion extended from the second substrate on a first side thereof in plan view, a plurality of pixel units that are disposed in a pixel region on the first substrate and individually have pixel electrodes, a data line driving circuit that is disposed along the first side in a peripheral region around the pixel region so as to supply an image signal to the pixel units, a plurality of external circuit connecting terminals that are arranged along the first side in a region of the peripheral region on the extended portion, an image signal line that is relayed around the data line driving circuit from the plurality of external circuit connecting terminals and has a first wiring line portion wired in a direction along the first side between the data line driving circuit and the pixel region, and a sealant that bonds the first and second substrates to each other in a sealing region around the pixel region. Each of the first wiring line portions is at least partially wired within the sealing region.

8 Claims, 10 Drawing Sheets

ELECTRO-OPTICAL DEVICE, METHOD OF MANUFACTURING ELECTRO-OPTICAL DEVICE, AND ELECTRONIC APPARATUS

BACKGROUND

1. Technical Field

The present invention relates to an electro-optical device, such as a liquid crystal device or the like, to a method of manufacturing such an electro-optical device, and to an electronic apparatus, such as a liquid crystal projector or the like, having such an electro-optical device.

2. Related Art

In such an electro-optical device, for example, a plurality of pixel electrodes are arranged on a TFT array substrate in a matrix, and a planar region in which the pixel electrodes are arranged serves as a pixel display region. At the time of the operation, image signals, scanning signals, and the like are supplied to electronic elements, such as pixel switching TFTs and the like, through wiring lines, such as data lines, scanning lines, and the like. And then, the image signals and the like are selectively supplied from the electronic elements to the pixel electrodes, such that matrix driving is performed. That is, in the image display region in which the plurality of pixel electrodes are arranged in a matrix in plan view, image display is performed. The TFT array substrate having such a configuration is bonded to a counter substrate with a predetermined gap therebetween, and an electro-optical material, such as liquid crystal or the like is filled between these substrates. In a peripheral region around the pixel display region from the regions on the TFT array substrate, a driving circuit unit having a scanning line driving circuit for supplying the scanning signals, a data line driving circuit for supplying the image signals, and the like is provided. In addition, a plurality of external circuit connecting terminals and a plurality of relay wiring lines including image signal lines relayed from the external circuit connecting terminals to the driving circuit unit and the like are provided.

JP-A-10-253990 is an example of the related art.

However, in an extended region from the counter substrate of the peripheral region as viewed from the normal direction of the substrate, the driving circuit unit, the external circuit connecting terminals, and the relay wiring lines described above need to be provided. Further, in the extended region, a margin region, which is required at the time of cutting from a mother substrate, needs to be ensured. In particular, in an electro-optical device in which a plurality of image signals subjected to serial-to-parallel conversion or phase expansion are supplied for high-definition display, without increasing a driving frequency, the number of external circuit connecting terminals and the number of image signal lines for supplying the plurality of image signals are increased. For example, an electro-optical device in which the number of serial-to-parallel conversion or the number of phase expansion is 24, 48, 96, or the like has been developed. In this case, due to the plurality of external circuit connecting terminals and the plurality of image signal lines, the extended region cannot but be made large. For this reason, due to the extended region or the peripheral region, which does not serve as the image display region, the TFT array substrate cannot be reduced in size or the electro-optical device cannot be reduced in size, while leaving the area of the image display region as it is.

SUMMARY

An advantage of some aspects of the invention is that it provides an electro-optical device which can realize reduction in size while an area of an image display region is ensured as it is, a method of manufacturing an electro-optical device, and an electronic apparatus having such an electro-optical device.

According to a first aspect of the invention, an electro-optical device includes first and second substrates that are bonded to each other, the first substrate having an extended portion from the second substrate on a first side thereof in plan view, a plurality of pixel units that are arranged in a pixel region on the first substrate and individually have pixel electrodes, a data line driving circuit that is disposed along the first side in a peripheral region around the pixel region so as to supply an image signal to the pixel units, a plurality of external circuit connecting terminals that are arranged along the first side in a region of the peripheral region on the extended portion, an image signal line that is relayed around the data line driving circuit from the plurality of external circuit connecting terminals the image signal line having a first wiring line portion that extends between the data line driving circuit and the pixel region in a direction following the first side, and a sealant that bonds the first and second substrates to each other in a sealing region around the pixel region. In this case, the first wiring line portion is at least partially wired within the sealing region.

According to this configuration, at the time of the operation, the image signals are supplied to the pixel units by the data line driving circuit, and, for example, an electro-optical material, such as liquid crystal or the like, interposed between the first and second substrates is driven by the individual pixel units, such that active matrix driving is performed. Moreover, a plurality of scanning lines and a plurality of data lines are wired so as to intersect each other on the first substrate. Further, each of the pixel units has a pixel switching TFT whose gate is connected to the corresponding scanning line. The pixel switching TFTs selectively supply the image signals supplied from the data lines to the pixel electrodes according to the scanning signals supplied from the scanning lines.

According to the above-described configuration, in particular, the first substrate has the extended portion from the second substrate on the first side in plan view, and the plurality of external circuit connecting terminals are arranged along the first side on the extended portion. Further, the data line driving circuit is also disposed along the first side, for example, on the extended portion. In addition, the image signal line has the first wiring line portion that is wired along the first side between the data line driving circuit and the pixel region on the first substrate in plan view. For example, the image signal line is plurally wired in parallel or horizontally according to the number of serial-to-parallel conversion. However, the first wiring line portion may be just one. And then, the first wiring line portion of the image signal line is at least partially wired within the sealing region, in which the sealant is disposed. Therefore, as compared with a case in which the first wiring line portion is disposed farther from the pixel region than from the sealing region, the extended portion can be made small. That is, as for the extended portion where the external circuit connecting terminals, the planar sizes of the first and second substrates can be close to each other, that is, the size of the first substrate can be made relatively small.

As a result, according to the above-described configuration, the peripheral region in the electro-optical device can narrow with respect to the pixel region, and thus the electro-optical device can be reduced in size, without narrowing the pixel region. In particular, according to the above-described configuration, in a general manufacturing process in which a plurality of electro-optical devices are formed on a mother substrate for a plurality of first substrates and then the mother substrate is cut so as to form the individual electro-optical devices, more electro-optical devices can be formed in the same area. When several, ten-odd, or tens of electro-optical devices are arranged on the same mother substrate, if the size of the first substrate becomes slightly small, for example, about several decimal mm or several mm, one or plural columns of electro-optical devices or one or plural rows of electro-optical devices can be further formed on the same mother substrate. Therefore, practically, what is necessary that the size of the first substrate can be made slightly small, and thus the effect is significant.

In the electro-optical device according to the first aspect of the invention, it is preferable that the image signal be a plurality of image signals subjected to serial-to-parallel conversion, and the first wiring line portion be a plurality of first wiring line portions for supplying the plurality of image signals. In this case, the plurality of first wiring line portions may be individually disposed within the sealing region.

According to this configuration, at the time of the operation, the plurality of image signals subjected to serial-to-parallel expansion are simultaneously supplied through the plurality of image signal lines. In particular, since the plurality of first wiring line portions are wired within the sealing region, the region on the first substrate can be effectively utilized, and thus the first substrate can be further reduced in size. For example, the image signal is the plurality of image signals subjected to serial-to-parallel expansion, and the image signal line is the plurality of image signal lines for supplying the plurality of image signals. For example, the image signals, which are expanded by a suitable number m, such as, 3, 6, 9, 12, 24, 48, 96, or the like, are supplied from m image signal lines. Therefore, as the number m becomes larger, the region on the first substrate can be further effectively utilized.

In addition, like the invention, if the first wiring line portion and the counter portion face each other, the image signal is influenced by capacitance between the first wiring line portion and the sealant or the counter substrate through the sealant. Besides, when the plurality of image signal lines, that is, the plurality of first wiring line portions, exist, a forming method of capacitance with the counter substrate may be changed due to the plurality of first wiring line portions, thereby causing display irregularity for each sequence of image signals. According to the above-described configuration, the plurality of first wiring line portions individually enter in the sealing region, and thus display irregularity can be reduced.

In the electro-optical device according to the first aspect of the invention, it is preferable that the image signal be a plurality of image signals subjected to serial-to-parallel conversion, and the first wiring line portion be a plurality of first wiring line portions for supplying the plurality of image signals. In this case, the plurality of first wiring line portions may be disposed such that parts thereof have the same area within the sealing region.

According to this configuration, at the time of the operation, the plurality of image signals subjected to serial-to-parallel conversion are simultaneously supplied through the plurality of image signal lines. In particular, since the plurality of first wiring line portions are at least partially disposed within the sealing region, the region on the first substrate can be further effectively utilized, and thus the first substrate can be further reduced in size. For example, as the number m of serial-to-parallel expansion becomes larger, the region on the first substrate can be further effectively utilized.

In addition, like the invention, if the first wiring line portion faces the sealant or the counter substrate through the sealant, the image signal is influenced by capacitance between the first wiring line portion and the sealant or the counter substrate through the sealant. Besides, when the plurality of image signal lines, that is, the plurality of first wiring line portions, exist, a forming method of capacitance with the counter substrate may be changed due to the plurality of first wiring line portions, thereby causing display irregularity for each sequence of image signals. According to the above-described configuration, since the plurality of first wiring line portions individually enter in the sealing region, display irregularity can be reduced. Moreover, 'the same area' described herein is preferably the same area for design and means that the difference falls within a range of a manufacturing error. Practically, the term purports that what is necessary is just to make it equal to such an extent that the forming method of capacitance does not cause a practical problem, such as display irregularity or the like. Therefore, this range is determined according to performance or specification required for an individual electro-optical device. What is necessary is to set the range of 'the same area' for an individual electro-optical device through experiment, experience, simulation, and the like.

In the electro-optical device according to the first aspect of the invention, it is preferable that the image signal line have a lead wiring line portion that is led from the first wiring line portion toward the pixel region, and the lead wiring line portion be at least partially disposed within the sealing region.

According to this configuration, from the image signal line, the first wiring line portion along the first side of the substrate, and the lead wiring line portion led from the first wiring line portion toward the pixel region, for example, in a direction intersecting the first side, are at least partially disposed within the sealing region. Therefore, the region on the first substrate can be further effectively utilized, and the first substrate can be further reduced in size.

The electro-optical device according to the first aspect of the invention may further include a counter electrode that is formed on the second substrate to commonly face the pixel electrodes individually provided in the plurality of pixel units and is cut in a region facing the first wiring line portion.

According to this configuration, a vertical electric field is generated between the plurality of pixel electrodes and the counter electrode common to the pixel electrodes, such that the electro-optical material can be driven in a vertical electric field driving mode for each pixel. According to this configuration, in particular, the counter electrode is cut in the region facing the first wiring line portion, and thus the first wiring line portion and the counter electrode, which, when the counter electrode is not cut, face each other through the gap between the substrates so as to form a capacitor structure, actually do not face each other. Therefore, an influence on the image signal by the counter electrode potential or an influence on the counter electrode potential by the image signal due to capacitance between the image signal line and the counter electrode can be effectively prevented. As a result, high image quality can be realized.

In the electro-optical device according to the first aspect of the invention, it is preferable that the image signal be a plurality of image signals subjected to serial-to-parallel conversion, and the first wiring line portion be a plurality of first wiring line portions for supplying the plurality of image signals. In this case, the counter electrode may be cut so as not to partially face the regions facing the plurality of first wiring line portions and such that parts thereof facing the plurality of first wiring line portions have the same area.

According to this configuration, the plurality of first wiring line portions partially face the counter electrode, and thus, due to capacitance between the first wiring line portions and the counter electrode, the image signal is influenced by the counter electrode potential or the counter electrode potential is influenced by the image signal. However, the difference in capacitance by sequences on the plurality of image signals subjected to serial-to-parallel expansion hardly exist, and thus little display irregularity for each sequence of image signals can be generated. As a result, high display quality can be realized, without causing the counter electrode to be extremely retreated. Moreover, 'the same area' described herein is preferably the same area for design and means that the difference falls within a range of a manufacturing error. Practically, the term purports that what is necessary is just to make it equal to such an extent that the forming method of capacitance does not cause a practical problem, such as display irregularity or the like. Therefore, this range is determined according to performance or specification required for an individual electro-optical device. What is necessary is to set the range of 'the same area' for an individual electro-optical device through experiment, experience, simulation, and the like.

The electro-optical device according to the first aspect of the invention may further include a vertical connecting terminal that is provided on the first substrate so as to supply a counter electrode potential to the counter electrode, the counter electrode extending to a region facing the vertical connecting terminal aside the cut portion, and a vertical connecting material that electrically connects the vertical connecting terminal and the extended portion of the counter electrode to each other between the first and second substrates.

According to this configuration, from four corners of the second substrate in the related art, the vertical connecting terminals are at least provided at two corners of one end or both ends of the first side of the second substrate along the first side of the first substrate, and the vertical connecting terminals and the counter electrode are connected to each other through the vertical connecting materials and the extended portion of the counter electrode. Moreover, the vertical connecting terminals are connected to wiring lines, which supply the counter electrode potential from the external circuit connecting terminals, from the relay wiring lines.

In the electro-optical device according to the first aspect of the invention, it is preferable that gap materials be mixed in the sealant so as to define a gap between the first and second substrates, and a planarization treatment be performed on a film disposed above the first wiring line portion on the first substrate.

According to this configuration, the gap between the substrates can be controlled by the bead-shaped or fiber-shaped gap materials mixed in the sealant. At this time, the gap materials do not need to be mixed in the electro-optical material, such as liquid crystal or the like, and columnar gap materials do not need to be incorporated in the pixel region. Besides, the planarization treatment is performed on the film disposed on the first wiring line portion, and thus the gap between the substrates can be controlled by the gap materials with high precision, as compared with a case in which the gap between the substrates is controlled while unevenness caused by the image signal line exists in the surface of the first substrate as it is. Here, the overlying film is planarized by a reflow through a CMP (Chemical Mechanical Polishing) treatment or a heat treatment. Alternatively, the overlying film may be formed by spin coating. In addition, instead of or in addition to the planarization treatment, a planarization treatment may be performed on the overlying film by forming a concave portion in an underlying film or the main body of the first substrate and by at least burying or sinking the first wiring line portion.

The electro-optical device according to the first aspect of the invention may further include a sampling circuit that is provided on the first substrate to sample the image signal supplied through the image signal line according to a sampling circuit driving signal to be supplied from the data line driving circuit and to supply the sampled image signal to data lines. In this case, the data line driving circuit may be disposed in a region of the peripheral region farther from the pixel region than from the sealing region, and the sampling circuit may be disposed in a region of the peripheral region closer to the pixel region than to the sealing region.

According to this configuration, at the time of the operation, while the sampling circuit driving signal is supplied from the data line driving circuit to the sampling circuit through a sampling circuit driving signal line, the image signal is supplied to the sampling circuit through the image signal line. Accordingly, the image signal can be supplied to the data lines at a predetermined timing, and active matrix driving by high-frequency driving can be performed. In particular, the data line driving circuit is disposed in the region farther from the sealing region, and the sampling circuit is disposed on the side closer than the sealing region. Accordingly, when the first and second substrates are bonded to each other in the manufacturing process, circuit elements of TFTs or the like constituting the data line driving circuit and circuit elements of TFTs or the like constituting the sampling circuit can be prevented from being damaged by compressive force acted on the sealant. Therefore, a practically significant advantage can be realized.

According to a second aspect of the invention, an electronic apparatus includes the above-described electro-optical device (including various configurations).

According to this configuration, the electronic apparatus includes the above-described electro-optical device. Therefore, various electronic apparatuses which can realize high image display can be implemented. For example, a television, a cellular phone, an electronic organizer, a word processor, a viewfinder-type or a monitor-direct-view-type video tape recorder, a workstation, a video phone, a POS terminal, a touch panel, or the like can be exemplified. In addition, an image forming apparatus, such as a printer, a copy machine, a facsimile machine, or the like, which uses the electro-optical device, can be exemplified.

According to a third aspect of the invention, there is provided a method of manufacturing an electro-optical device, in which first and second substrates are bonded to each other, and the first substrate has an extended portion from the second substrate on a first side thereof in plan view. The method includes forming a plurality of pixel units that are arranged in a pixel region on the first substrate and individually have pixel electrodes, a scanning line driving circuit that is disposed along at least one second side adjacent to the first side of the first substrate in a peripheral region around the pixel region so as to drive the pixel units through scanning lines, a data line driving circuit that is disposed along the first side in the peripheral region so as to drive the pixel units through data lines, a plurality of external circuit connecting terminals that are arranged along the first side in a region of the peripheral region on the extended portion, and a plurality of lead wiring lines including an image signal line that is relayed from the plurality of external circuit connecting terminals and has a first wiring line portion wired in a direction along the first side between the data line driving circuit and the pixel region on the first substrate in plan view, and bonding the first and second substrates to each other by a sealant in a sealing region of the peripheral region around the pixel region. In this case, in the forming, the first wiring line portion may be at least partially formed within the sealing region.

According to this configuration, the above-described electro-optical device can be easily manufactured. Moreover, in the method of manufacturing an electro-optical device of the third aspect of the invention, various configurations corresponding to various configurations of the above-described electro-optical device can be adopted.

The effects and advantages of the invention will be apparent from embodiments described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. In the following embodiments, a liquid crystal device of a TFT active matrix driving mode with a driving circuit incorporated therein, which is an example of an electro-optical device of the invention, is exemplified.

First Embodiment

A liquid crystal device according to the first embodiment will be described with reference to FIGS. 1 to 8.

Figure 1:
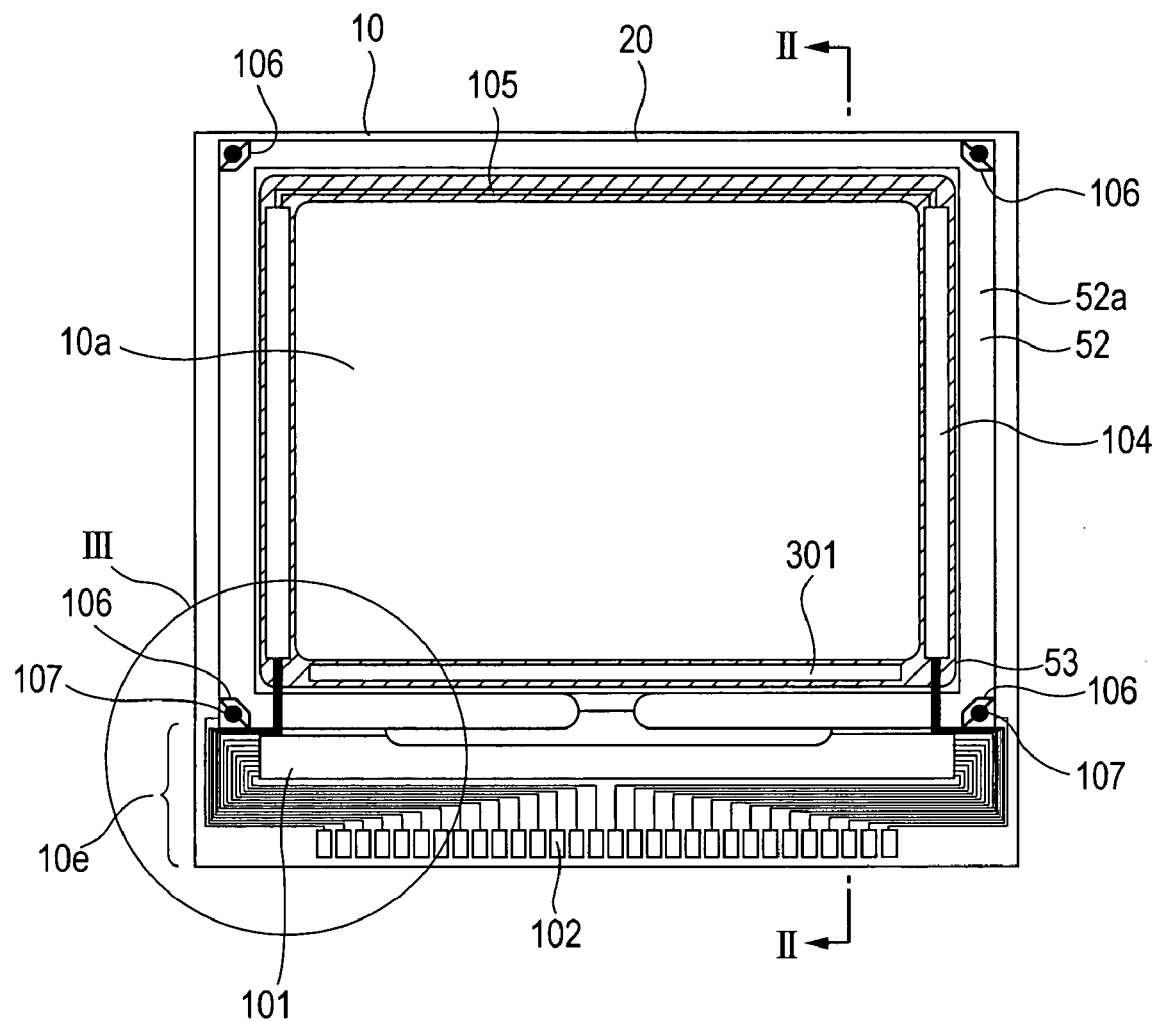
FIG. 1 is a plan view showing the overall configuration of an electro-optical device according to a first embodiment of the invention.
Figure 2:
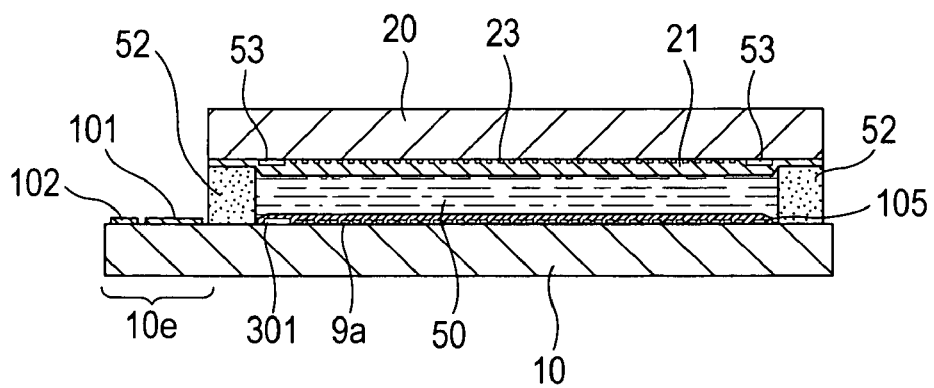
FIG. 2 is a cross-sectional view taken along the line II-II of FIG. 1.

First, the overall configuration of the liquid crystal device according to this embodiment will be described with reference to FIGS. 1 and 2. FIG. 1 is a plan view showing the configuration of the liquid crystal device according to this embodiment. FIG. 2 is a cross-sectional view taken along the line II-II of FIG. 1.

Referring to FIGS. 1 and 2, in the liquid crystal device according to this embodiment, a TFT array substrate 10 and a counter substrate 20 are disposed to face each other. A liquid crystal layer 50 is filled between the TFT array substrate 10 and the counter substrate 20. The TFT array substrate 10 and the counter substrate 20 are bonded to each other by a sealant 52, which is provided in a sealing region 52a around a pixel region (hereinafter, referred to as an image display region) 10a.

Referring to FIG. 1, inside the sealing region 52a in which the sealant 52 is disposed, a frame-shaped light-shielding film 53 is provided on the counter substrate 20 so as to define a frame region of the image display region 10a. In a region outside the sealing region 52a, in which the sealant 52 is disposed, of a peripheral region, a data line driving circuit 101 and external circuit connecting terminals 102 are provided along one side of the TFT array substrate 10. Inside the sealing region 52a along one side, a sampling circuit 301 is provided so as to be covered with the frame-shaped light-shielding film 53. Further, scanning line driving circuits 104 are provided inside the sealing region 52a along two sides adjacent to one side so as to be covered with the frame-shaped light-shielding film 53. In addition, a plurality of wiring lines 105 are provided along a remaining side of the TFT array substrate 10 so as to connect the two scanning line driving circuits 104 provided on both sides of the image display region 10a and so as to be covered with the frame-shaped light-shielding film 53. Further, on the TFT array substrate 10, vertical connecting terminals 106 are disposed in regions corresponding to four corners of the counter substrate 20 so as to connect both substrates by vertical connecting materials 107. Accordingly, the TFT array substrate 10 and the counter substrate 20 can be electrically connected to each other.

Referring to FIG. 2, on the TFT array substrate 10, a laminated structure of pixel switching TFTs (Thin Film Transistors) serving as driving elements or wiring line, such as scanning lines, data lines, and the like, is formed. In the image display region 10a, pixel electrodes 9a are provided on the pixel switching TFTs or the wiring lines, such as the scanning lines, the data lines, and the like. On the other hand, on a surface of the counter substrate 20 facing the TFT array substrate 10, a light-shielding film 23 is formed. And then, on the light-shielding film 23, a counter electrode 21 formed of a transparent material, such as ITO or the like, is formed to face the plurality of pixel electrodes 9a.

Figure 3:
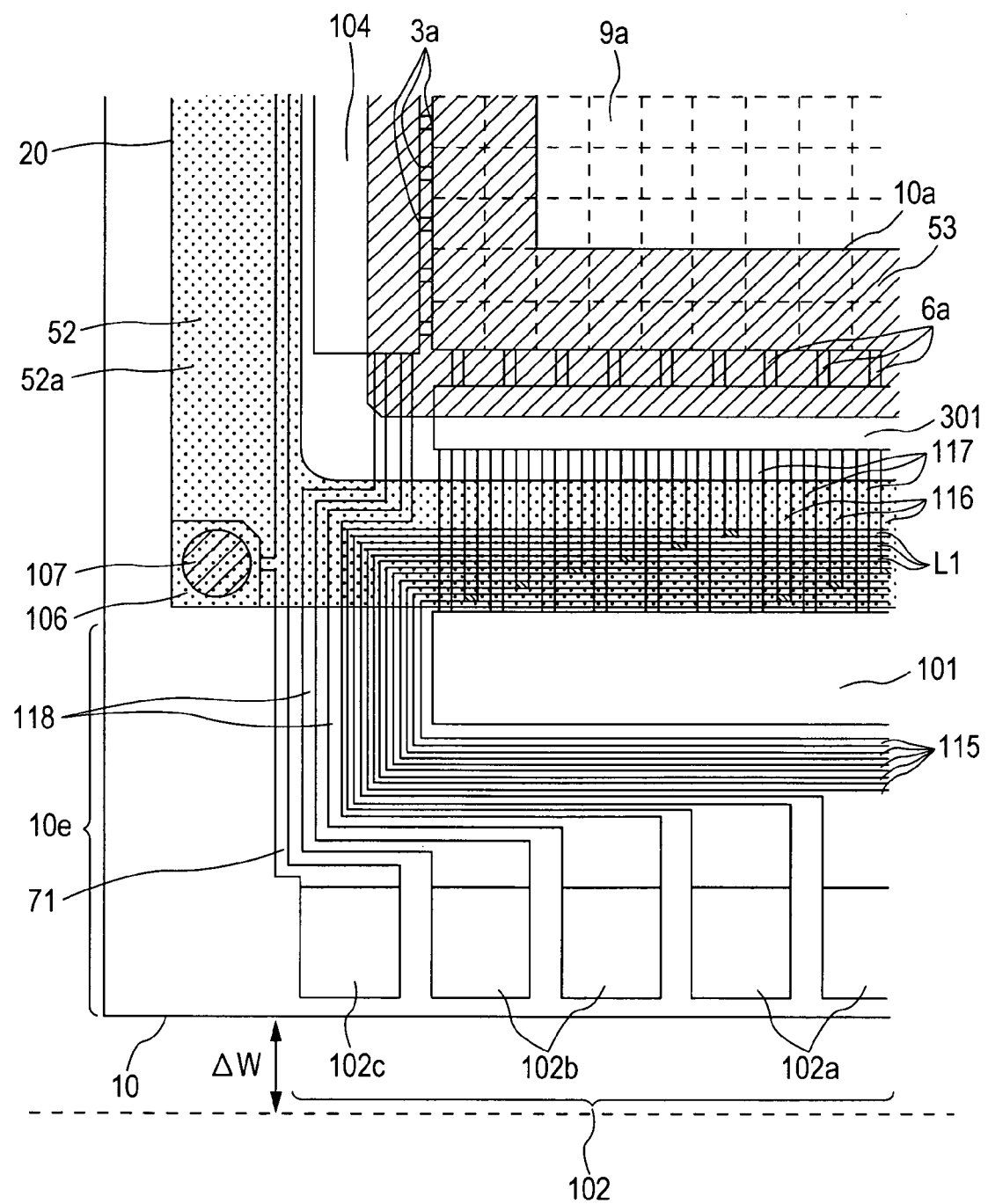
FIG. 3 is a partial plan view showing a region indicated by III in FIG. 1 on a magnified scale.
Figure 4:
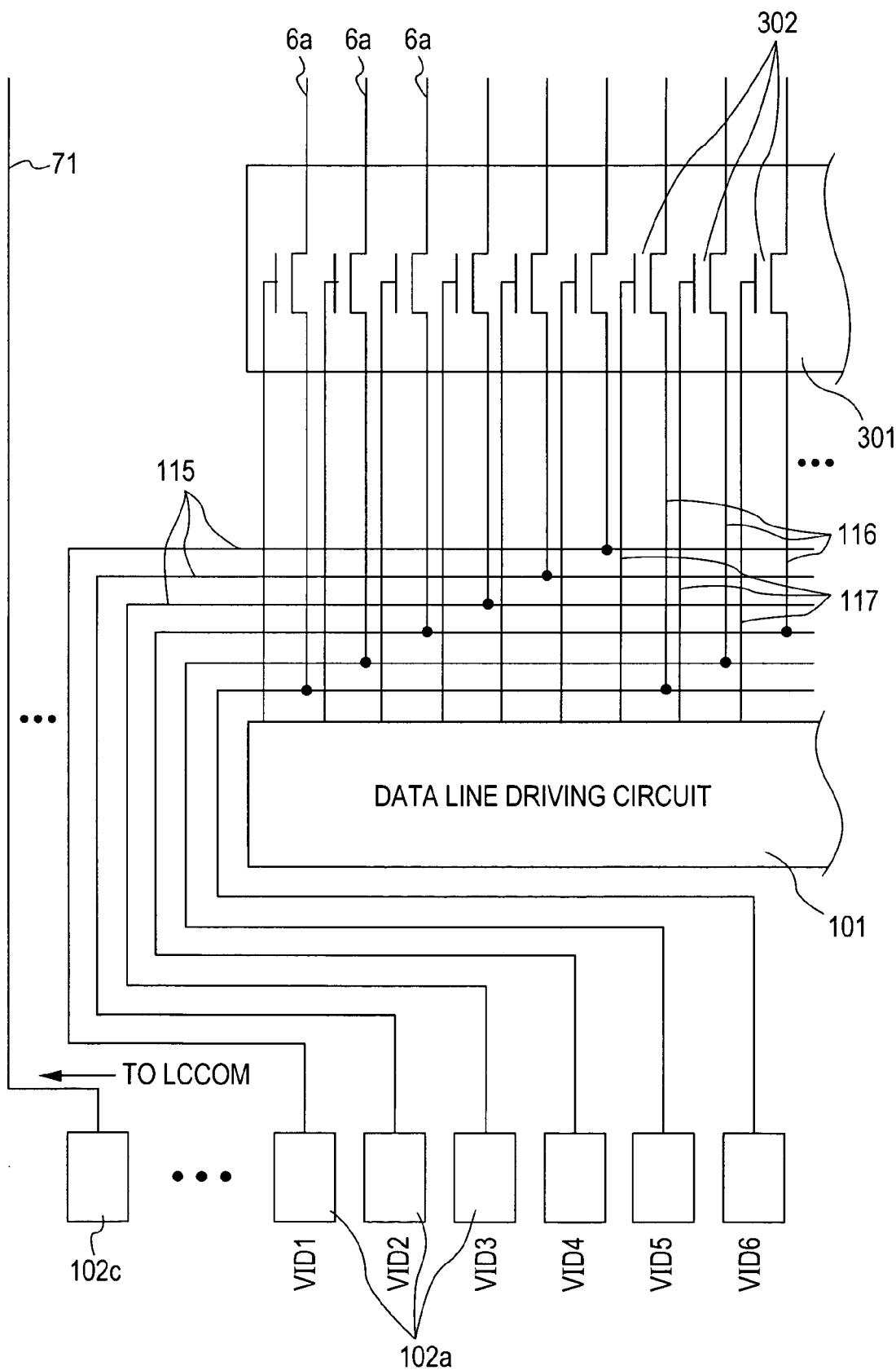
FIG. 4 is a circuit diagram showing the outline of the circuit configuration of a data line driving circuit and a sampling circuit according to the first embodiment of the invention, together with relay wiring lines.
Figure 5:
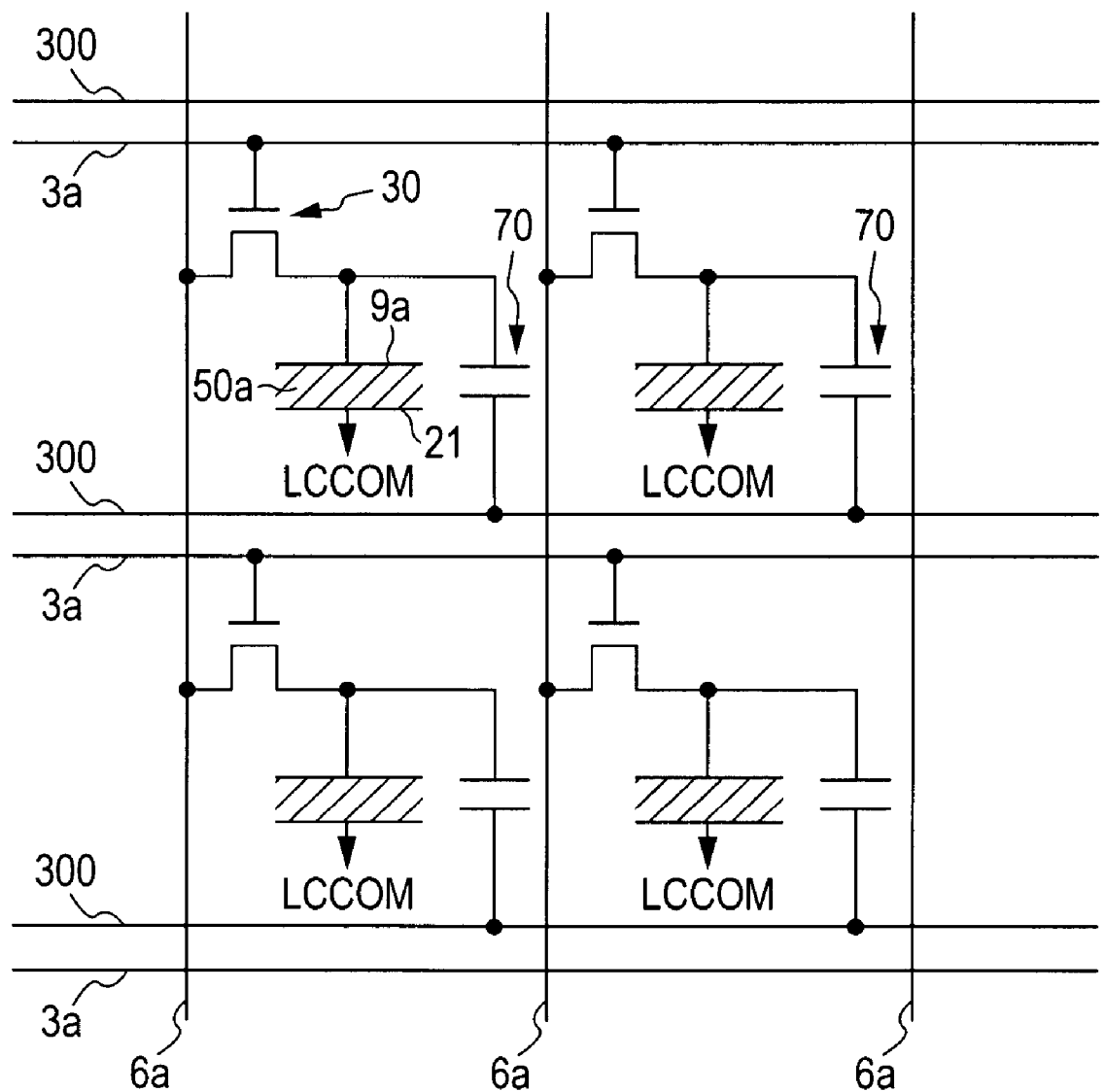
FIG. 5 is a circuit diagram showing the outline of the circuit configuration of a counter electrode, to which a counter electrode potential is supplied from a vertical connecting terminal, and a pixel circuit according to the first embodiment of the invention.

Next, the details of a planar layout of the data line driving circuit and image signal lines relayed from the external circuit connecting terminals will be described with reference to FIGS. 3 to 5. FIG. 3 is a partial plan view showing a circle region III of FIG. 1 in the liquid crystal device according to this embodiment on a magnified scale. FIG. 4 is a circuit diagram showing the outline of the circuit configuration of the data line driving circuit and the sampling circuit, together with relay wiring lines. FIG. 5 is a circuit diagram showing the outline of the circuit configuration of the counter electrode, to which a counter electrode potential is supplied from the vertical connecting terminal, and a pixel circuit.

As shown in FIG. 3, in this embodiment, in particular, the TFT array substrate 10 has an extended portion 10e from the counter substrate 20 on a first side (lower side in FIG. 3) in plan view. In a region on the extended portion 10e, the plurality of external circuit connecting terminals 102 are provided along the first side. The plurality of external circuit connecting terminals 102 include image signal terminals 102a for supplying image signals, scanning-line-driving-circuit terminals 102b for supplying various signals, such as a clock signal, an inverted clock signal, a start pulse signal, a scanning direction control signal, a power supply signal, and other special control signals, to the scanning line driving circuit 104, and counter-electrode-potential terminals 102c for supplying the counter electrode potential or common potential to the vertical connecting terminals 106. Moreover, though not shown, the plurality of external circuit connecting terminals 102 further include data-line-driving-circuit terminals for supplying various signals, such as a clock signal, an inverted clock signal, a start pulse signal, a scanning direction control signal, a power supply signal, and other special control signals, test terminals, and the like.

The scanning line driving circuit 104 is disposed along a second side (left side in FIG. 3), and scanning-line-driving-circuit relay wiring lines 118 are relayed from the scanning-line-driving-circuit terminals 102b to the scanning line driving circuit 104.

From the counter-electro-potential terminal 102c, a counter-electrode relay wiring line 71 is relayed to the vertical connecting terminal 106, and then is relayed to other vertical connecting terminals 106 along the second side.

The data line driving circuit 101 is disposed along the first side, and data-line-driving-circuit relay wiring lines are relayed from the data-line-driving-circuit terminals (not shown) to the data line driving circuit 101.

From the image signal terminals 102a, image signal lines 115 are relayed around the data line driving circuit 101. From the image signal lines 115, lead wiring line portions 116 are wired to the sampling circuit 301. On the other hand, from the data line driving circuit 101, sampling circuit driving signal lines 117 are wired to the sampling circuit 301.

The circuit configuration of the data line driving circuit 101 and the sampling circuit 301 or the electrical connection by the relay wiring lines and the like are as shown in FIG. 4.

As shown in FIG. 4, the lead wiring line portion 116 from each of the image signal lines 115 is connected to a source of a sampling switch 302, which is a TFT constituting the sampling circuit 301, and each of the sampling circuit driving signal lines 117 from the data line driving circuit 101 is connected to a gate of the sampling switch 302. Accordingly, at the time of the operation of the electro-optical device, image signals applied to the image signal terminals 102a from an external circuit are supplied to the sampling circuit 301 through the lead wiring line portions 116 from the image signal lines 115. Here, the image signals to be supplied to the sampling circuit 301 are supplied to the sampling circuit 301 for each group of six data lines 6a as image signals VID1 to VID6, which are subjected to serial-to-parallel expansion and are converted into six phases. And then, the image signals are sampled at timings according to sampling circuit driving signals supplied from the data line driving circuit 101 through the sampling circuit driving signal lines 117 on the basis of outputs of shift registers. At this time, since the image signals VID1 to VID6 are image signals which are subjected to serial-to-parallel conversion and are converted into six phases, the data line driving circuit 101 divides the individual sampling circuit driving signal into six at the last stage, and simultaneously supplies them to a group of six sampling switches 302 corresponding to the group of six data lines 6a. Subsequently, the simultaneously sampled image signals for each group of six data lines 6a are correspondingly supplied to the data lines 6a.

Further, at the time of such an operation, the counter electrode potential LCCOM to be applied to the counter-electrode-potential terminal 102c from the external circuit is supplied to the counter electrode 21 through the counter-electrode relay wiring line 71 and the vertical connecting terminal 106.

As shown in FIG. 5, the counter electrode 21, to which the counter electrode potential LCCOM is supplied in such a manner, is disposed to face the pixel electrodes 9a with the liquid crystal layer 50 interposed therebetween, thereby constructing a liquid crystal capacitor 50a. Here, each pixel unit has the pixel switching TFT 30 whose source is connected to the data line 6a, to which the image signal is supplied in the above-described manner. A scanning line 3a, to which the scanning signal is supplied from the scanning line driving circuit 104 (see FIGS. 1 to 3), is connected to a gate of the TFT 30. Therefore, the TFT 30 is turned on at a timing in which the scanning signal is supplied through the scanning line 3a, and then the image signal is written into the pixel electrode 9a through the data line 6a and the source-drain of the TFT 30. Moreover, in order to increase a potential holding property in the liquid crystal capacitor 50a, a storage capacitor 70 is constructed in parallel with the liquid crystal capacitor 50a.

Such a storage capacitor 70 is constructed by disposing a part of a capacitor line 300 for supplying a predetermined potential or a fixed potential capacitor electrode connected to the capacitor line 300 and a pixel potential capacitor electrode connected to the pixel electrode 9a so as to face each other with a dielectric film interposed therebetween.

With this configuration, in the liquid crystal device according to this embodiment, at the time of the operation, the scanning signals are supplied to the pixel units by the scanning line driving circuit 104 through the scanning lines 3a, and the image signals are supplied to the pixel units by the data line driving circuit 101 through the data lines 6a, such that active matrix driving is performed in each pixel unit.

Returning to FIG. 3, in this embodiment, in particular, the TFT array substrate 10 has the extended portion 10e from the counter substrate 20 on the first side (lower side in FIG. 3) in plan view, and, on the extended portion 10e, the plurality of external circuit connecting terminals 102 are arranged along the first side. Further, the data line driving circuit 101 also is disposed along the first side on the extended portion 10e. In addition, each of the image signal lines 115 has a first wiring line portion L1 which is wired along the first side between the data line driving circuit 101 and the image display region 10a in plan view. The six image signal lines 115 are wired in parallel according to the number of serial-to-parallel expansion. However, the first wiring line portion L1 may be one. And then, the first wiring line portion L1 of the image signal line 115 is at least partially wired within the sealing region 52a, in which the sealant 52 is disposed.

Figure 6:
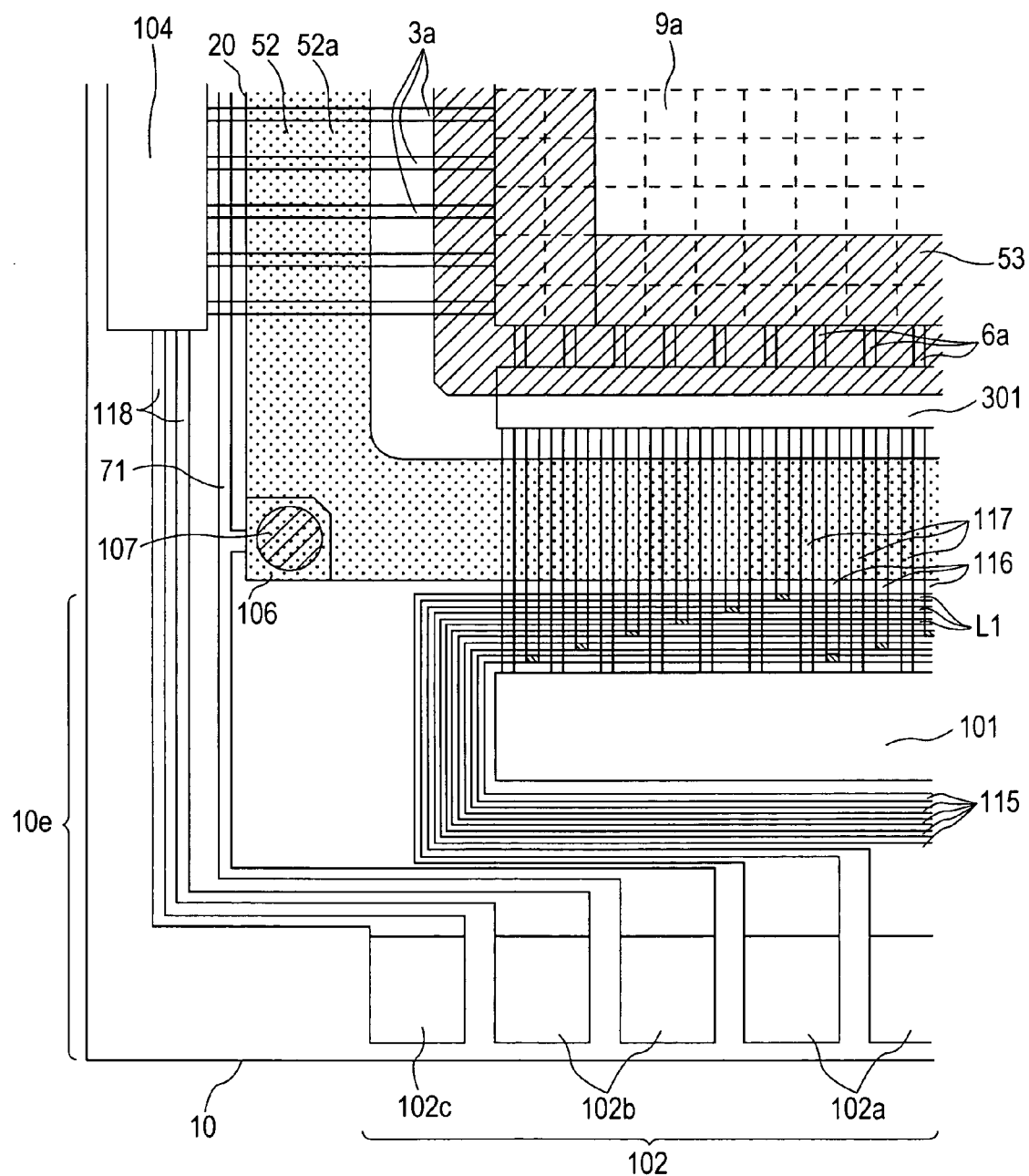
FIG. 6 is a partial plan view in a comparative example of the first embodiment of the invention, which corresponds to FIG. 3.

Here, through the comparison with a comparative example of this embodiment shown in FIG. 6, the advantages of this embodiment having the above-described configuration will be examined. FIG. 6 is a partial plan view of a comparative example of this embodiment, which corresponds to FIG. 3.

In the comparative example shown in FIG. 6, the first wiring line portion L1 of the image signal line 115 is disposed on a side farther from the image display region 10a than from the sealing region 52a, in which the sealant 52 is disposed. That is, the first wiring line portion L1 is not wired within the sealing region 52a. Other parts are almost the same as those of the embodiment shown in FIG. 3. For this reason, in the comparative example, as for the extended portion 10e, the planar sizes of the TFT array substrate 10 and the counter substrate 20 cannot be close to each other, that is, the size of the TFT array substrate 10 cannot be made relatively small.

In the liquid crystal device of this embodiment shown in FIG. 3, as compared with the comparative example of FIG. 6, the width of the TFT array substrate 10 can be made narrow by ΔW, and thus the extended portion 10e can be made small. That is, as for the extended portion 10e in which the external circuit connecting terminals 102 are arranged, the planar shapes of the TFT array substrate 10 and the counter substrate 20 can be close to each other, that is, the size of the TFT array substrate 10 can be made relatively small.

As a result, according to this embodiment, the peripheral region in the liquid crystal device can be made narrow with respect to the image display region 10a, and the liquid crystal device can be reduced in size, without narrowing the image display region 10a. In particular, according to this configuration, in a general manufacturing process in which a plurality of liquid crystal devices are formed on a mother substrate for a plurality of TFT array substrates 10 and then the mother substrate is cut so as to form the individual liquid crystal devices, more liquid crystal devices can be formed in the same area. When several, ten-odd, or tens of liquid crystal devices are arranged on the same mother substrate, if the size of the TFT array substrate becomes slightly small, for example, about several decimal mm or several mm, one or plural columns liquid crystal devices or one or plural rows of liquid crystal devices can be further formed on the same mother substrate. Therefore, practically, what is necessary is that the size of the TFT array substrate 10 can be made slightly small, and thus the effect is significant.

Referring to FIGS. 3 and 4, in this embodiment, the image signals are the six image signals VID1 to VID6 subjected to serial-to-parallel conversion, and the six first wiring line portions L1 for supplying the six image signals VID1 to VID6 are individually disposed within the sealing region 52a. And also, the six first wiring line portions L1 extend between the data line driving circuit 101 and the pixel region in a direction following the edge of the extended portion 10e of the TFT array substrate 10.

For this reason, at the time of the operation, the six image signals VID1 to VID6 subjected to serial-to-parallel conversion are simultaneously supplied through the six image signal lines 115. In particular, since the six first wiring line portions L1 are individually disposed within the sealing region 52a, the region on the TFT array substrate 10 can be further effectively utilized, and thus the TFT array substrate 10 can be further reduced in size.

In particular, in the comparative example, the number of phase expansion is 6 and the six image signal lines are horizontally arranged. However, actually, the number of phase expansion may be 9, 12, 24, 48, or 96, that is, 9, 12, 24, 48, or 96 image signal lines may be horizontally arranged. Therefore, the planar region of plural image signal lines arranged between the sealing region and the data line driving circuit is slightly made large, as compared with the planar region of the data line driving circuit or the like. That is, as the number of phase expansion is large, the configuration of this embodiment is markedly advantageous, as compared with the comparative example.

In addition, like this embodiment, if the first wiring line portion L1 and the counter substrate 20 face each other, the image signals VID1 to VID6 are influenced by capacitance between the first wiring line portion L1 and the sealant 52 or the counter substrate 20 through the sealant 52. Besides, when the plurality of image signal lines 115, that is, the plurality of first wiring line portions L1, exist, a forming method of capacitance with the counter substrate 20 may be changed due to the plurality of first wiring line portions L1, which causes display irregularity for each sequence of the image signals VID1 to VID6. According to this embodiment, since the plurality of first wiring line portions L1 individually enter in the sealing region 52a, that is, since the forming methods of capacitance between the plurality of first wiring line portions L1 and the counter substrate 20 are close to each other between the wiring lines, display irregularity can be reduced.

More preferably, the six first wiring line portions L1 are disposed such that parts thereof in the sealing region 52a have the same area. According to this configuration, display irregularity for each sequence of the image signals VID1 to VID6 due to the change of the forming method of capacitance with the counter substrate 20 by the plurality of first wiring line portions L1 can be reduced. Moreover, what is necessary is to set the range of 'the same area' described herein for an individual liquid crystal device through experiment, experience, simulation, and the like.

In this embodiment, each of the image signal lines 115 has the lead wiring line portion 116 led from the first wiring line portion L1 toward the image display region 10a to correspond to the data line 6a. Further, of the image signal line 115, the first wiring line portion L1 along the first side of the TFT array substrate 10 and the lead wiring line portion 116 led from the first wiring line portion L1 toward the image display region 10a in the direction intersecting the first side are at least partially disposed within the sealing region 52a. Therefore, the region on the TFT array substrate 10 can be further effectively utilized, and thus the TFT array substrate 10 can be further reduced in size.

Moreover, the lead wiring line portions 116 are led from the first wiring line portions L1 and reach the sampling circuit 301. Therefore, in this case, the sampling circuit driving signal lines 117 are also at least partially disposed within the sealing region 52a horizontally to the lead wiring line portions 116.

Returning to FIG. 3, in this embodiment, the gap materials are mixed in the sealant 52 to define the gap between the TFT array substrate 10 and the counter substrate 20. Further, on the TFT array substrate 10, the planarization treatment is performed on the film disposed on the first wiring line portion L1.

Therefore, the gap between the substrates can be controlled by the bead-shaped or fiber-shaped gap material mixed in the sealant 52. At this time, the gap materials do not need to be mixed in liquid crystal, and the columnar gap materials do not need to be incorporated in the image display region 10a. Besides, the planarization treatment is performed on the film disposed on the first wiring line portion L1, and thus the gap between the substrates can be controlled by the gap materials with high precision, as compared with a case in which the gap between the substrates is controlled while unevenness caused by the image signal lines 115 exists in the surface of the TFT array substrate 10 as it is. In addition, by planarizing the surface of the substrate in the above-described manner, a possibility that the image signal line 115 or the lead wiring line portion 116 wired in the sealing region 52a is disconnected or short-circuited at a place where a pressure is concentrated due to unevenness of the surface of the substrate at the time of bonding both substrates can be reduced.

Here, the overlying film is planarized by a reflow through a CMP (Chemical Mechanical Polishing) treatment or a heat treatment. Alternatively, the overlying film may be formed by spin coating. In addition, instead of or in addition to the planarization treatment, a planarization treatment may be performed on the overlying film by forming a concave portion in an underlying film or the main body of the TFT array substrate 10 and by at least burying or sinking the first wiring line portion L1.

Referring to FIG. 3, in this embodiment, on the TFT array substrate 10, the sampling circuit 301 that samples the image signals VID1 to VID6 supplied through the image signal lines 115 according to the sampling circuit driving signals supplied from the data line driving circuit 101 and supplies the sampled image signals to the data lines 6a is further provided. Further, in the peripheral region, the data line driving circuit 101 is disposed in the region farther from the image display region 10a than from the sealing region 52a, and the sampling circuit 301 is disposed on the side closer to the image display region 10a than to the sealing region 52a.

For this reason, at the time of the operation, the image signals VID1 to VID6 are supplied to the sampling circuit 301 through the image signal lines 115, while the sampling circuit driving signals are supplied to the sampling circuit 301 from the data line driving circuit 101 through the sampling circuit driving signal lines 117. Accordingly, the image signals VID1 to VID6 can be supplied to the data lines 6a at the predetermined timing, such that active matrix driving by high-frequency driving can be performed. In particular, the data line driving circuit 101 is disposed in the region farther from the sealing region 52a, and the sampling circuit 301 is disposed on the side closer than the sealing region 52a. Therefore, when the TFT array substrate 10 and the counter substrate 20 are bonded to each other in the manufacturing process, circuit elements of TFTs or the like constituting the data line driving circuit 101 and circuit elements of TFTs or the like constituting the sampling circuit 301 can be prevented from being damaged by compressive force acted on the sealant 52. Therefore, a practically significant advantage can be realized.

Further, on the counter substrate 20, the frame-shaped light-shielding film 53 is further provided so as to define the frame region of the image display region 10a, and the sampling circuit 301 is at least partially within the frame region, in which the frame-shaped light-shielding film 53 is formed, of the peripheral region. For this reason, by using the frame region located inside the sealing region 52a, a region for forming the sampling circuit 301 can be ensured. Accordingly, by the sampling circuit 301 disposed inside the sealing region 52a, the image display region 10a can be effectively prevented from being reduced. Moreover, the frame-shaped light-shielding film may be disposed on at least one of the TFT array substrate 10 and the counter substrate 20.

Second Embodiment

Figure 7:
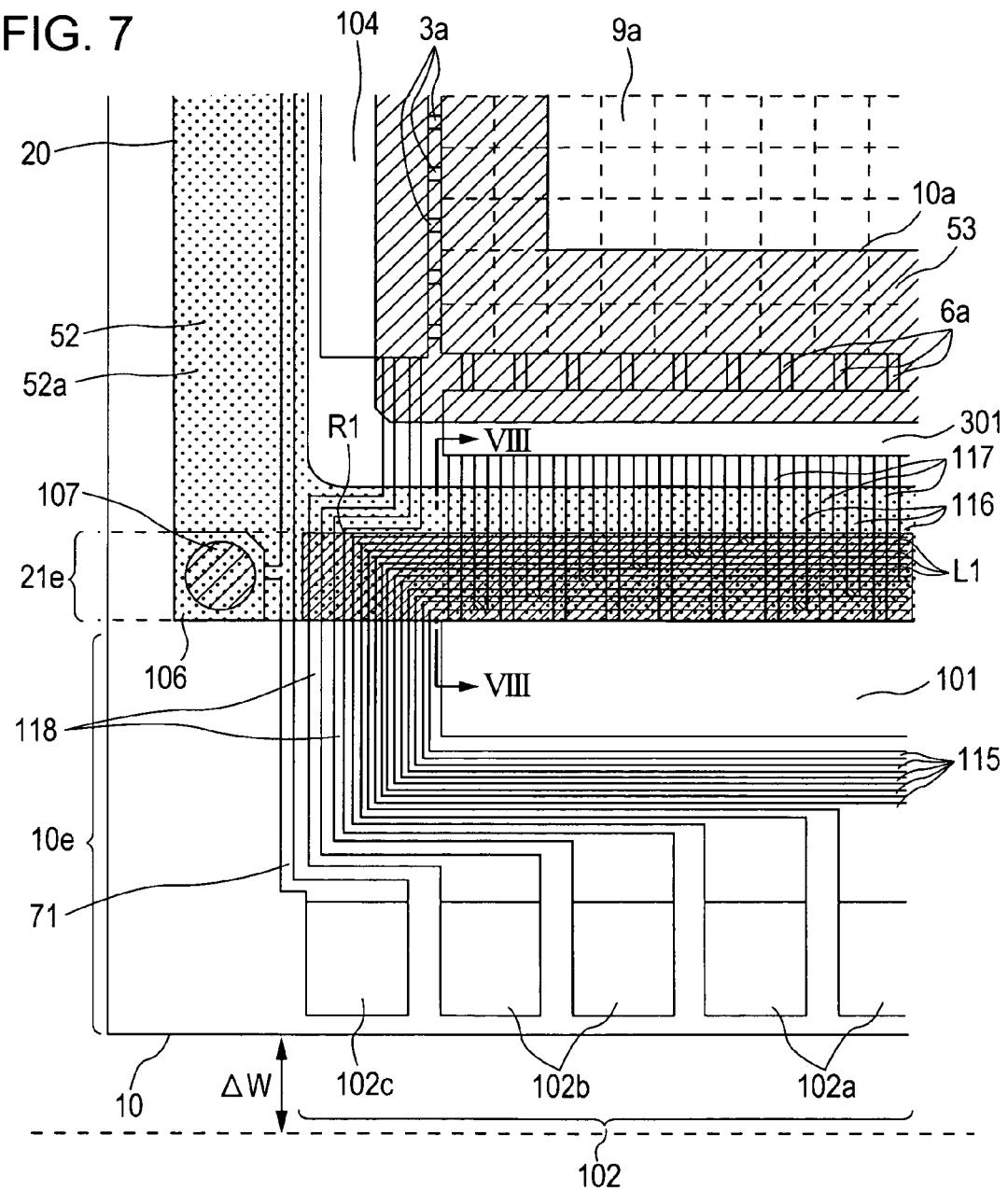
FIG. 7 is a plan view in a second embodiment of the invention, which corresponds to FIG. 3.
Figure 8:
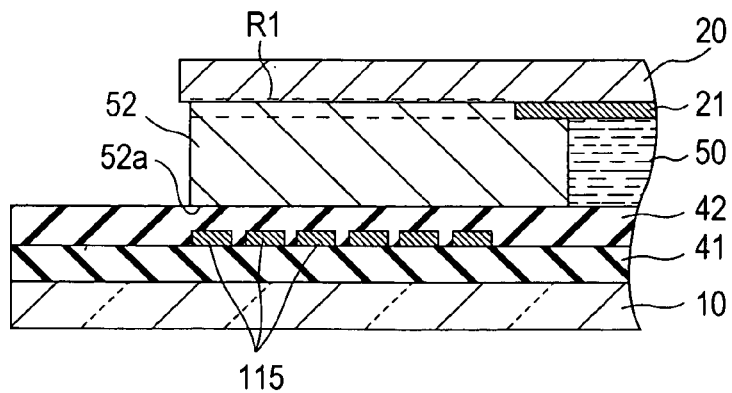
FIG. 8 is a cross-sectional view taken along the line VIII-VIII of FIG. 7.

Next, a liquid crystal device according to a second embodiment will be described with reference to FIGS. 7 and 8. FIG. 7 is a plan view of the second embodiment, which corresponds to FIG. 3. FIG. 8 is a cross-sectional view taken along the line VIII-VIII of FIG. 7. Moreover, in FIGS. 7 and 8, the same parts as those in the first embodiment shown in FIG. 3 are represented by the same reference numerals, and the descriptions thereof will be omitted.

Referring to FIGS. 7 and 8, in the liquid crystal device according to this embodiment, the counter electrode 21 is formed on the counter substrate 20 to commonly face the pixel electrodes 9a (see FIG. 2) individually provided in the plurality of pixel units. Further, the counter electrode 21 is cut in a cut portion R1 of a region facing the first wiring line portion L1.

On the TFT array substrate 10, the first wiring line portion L1 is formed on a first interlayer insulating film 41, and a second interlayer insulating film 42 is formed thereon.

According to this embodiment, a vertical electric field is generated between the plurality of pixel electrodes 9a (see FIG. 2) and the counter electrode 21 common to the pixel electrodes 9a, such that vertical electric field driving of liquid crystal can be performed for each pixel. In particular, in this embodiment, the counter electrode 21 is cut in the cut portion R1 of the region facing the first wiring line portion L1, and thus the first wiring line portion L1 and the counter electrode 21, which, when the counter electrode 21 is not cut, face each other through the gap between the substrates so as to form a capacitor structure, actually do not face each other. Therefore, an influence on the image signals VID1 to VID6 by the counter electrode potential or an influence on the counter electrode potential by the image signals VID1 to VID6 due to capacitance between the image signal line 115 and the counter electrode 21 can be effectively prevented. As a result, high image quality can be realized.

Moreover, in this embodiment, preferably, the counter electrode 21 is cut so as not to face the region facing the first wiring line portion L1 at all. Alternatively, the cut portion R1 may be increased, and a portion of the counter electrode 21 closest to the first wiring line portion L1 in plan view may be retreated from the first wiring line portion L1 by a suitable distance.

That is, when the cut portion R1 is formed, for example, of the counter electrode 21 formed on the almost entire surface of the counter substrate 20, a rectangular region facing the first wiring line portion L1 may be cut, and a region facing the pixel electrode 9a and a region facing the vertical connecting terminal 106 may remain.

Referring to FIG. 7, in this embodiment, on the TFT array substrate 10, the vertical connecting terminal 106 is further provided so as to supply the counter electrode potential to the counter electrode 21. The counter electrode 21 has an extended portion 21e extending to a region facing the vertical connecting terminal 106 aside the cut portion R1. The vertical connecting material 107 may be further provided so as to electrically connect the vertical connecting terminal 106 and the extended portion 21e of the counter electrode 21 between the TFT array substrate 10 and the counter substrate 20.

According to this configuration, like the related art, from four corners of the counter substrate 20, the vertical connecting terminals 106 are at least provided at two corners of one end or both ends of the first side of the counter substrate 20 along the first side of the TFT array substrate 10, and the vertical connecting terminals 106 and the counter electrode 21 are vertically connected to each other through the vertical connecting materials 107 and the extended portion 21e of the counter electrode 21. Moreover, the vertical connecting terminals 106 are connected to the counter-electrode relay wiring lines 71 for supplying the counter electrode potential from the external circuit connecting terminals 102.

Modification

Figure 9:
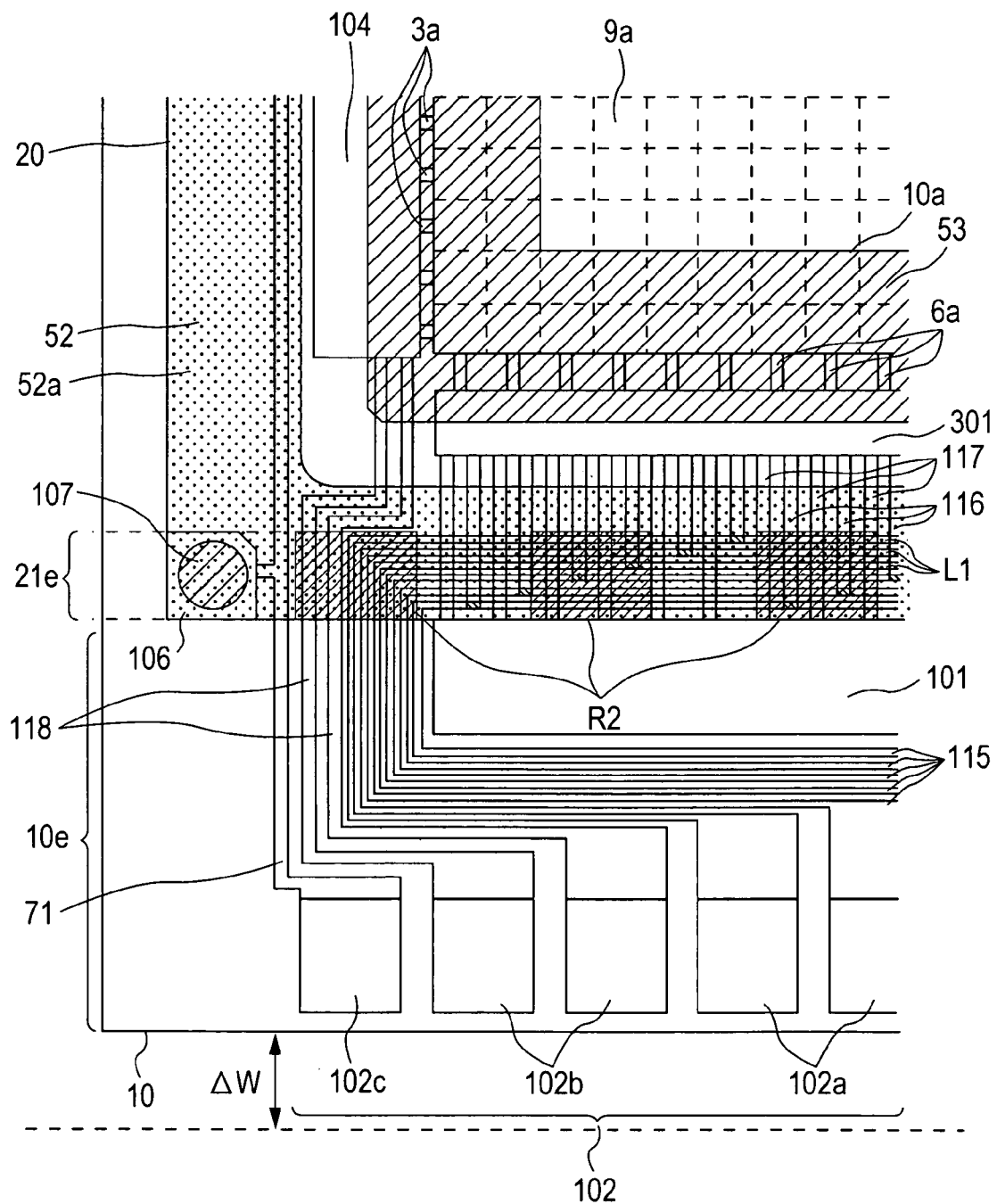
FIG. 9 is a plan view in a modification, which corresponds to FIG. 7.

As shown in FIG. 9 by way of a modification, in the counter electrode 21, cut portions R2 may be cut so as not to partially face the regions facing the plurality of first wiring line portions L1 and such that parts facing the plurality of first wiring line portions L1 have the same area. FIG. 9 is a diagram of the modification, which corresponds to FIG. 7. Moreover, in FIG. 9, the same parts as those in the first embodiment shown in FIG. 3 are represented by the same reference numerals, and the descriptions thereof will be omitted.

According to this configuration, the plurality of first wiring line portions L1 partially face the counter electrode 21, and thus, due to capacitance between the first wiring line portions L1 and the counter electrode 21, the image signals VID1 to VID6 are influenced by the counter electrode potential or the counter electrode potential is influenced by the image signals VID1 to VID6. However, the difference in capacitance by sequences on the plurality of image signals VID1 to VID6 subjected to serial-to-parallel expansion hardly exist, and thus little display irregularity for each sequence of the image signals VID1 to VID6 can be generated. As a result, high display quality can be realized, without causing the counter electrode 21 to be extremely retreated. Moreover, what is necessary is to set the range of 'the same area' described herein for an individual electro-optical device through experiment, experience, simulation, and the like.

Third Embodiment

Figure 10:
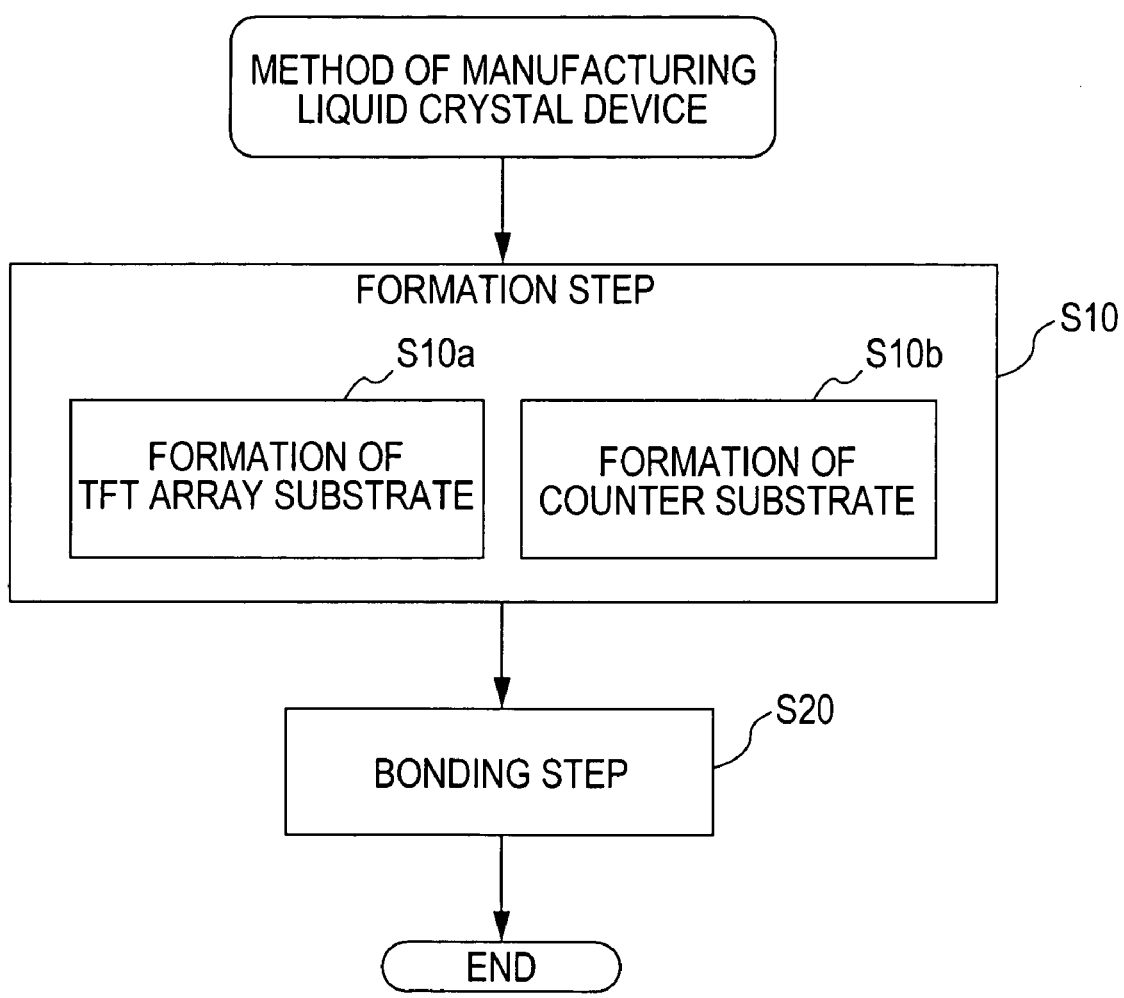
FIG. 10 is a flowchart showing a method of manufacturing a liquid crystal device according to this embodiment.

Next, a method of manufacturing a liquid crystal device according to a third embodiment will be described with reference to FIGS. 2, 3, and 10. FIG. 10 is a flowchart showing a method of manufacturing a liquid crystal device according to this embodiment.

As shown in FIG. 10, in the method of manufacturing a liquid crystal device according to this embodiment, first, in a formation process (Step S10), through the process including various kinds of processing, such as a film deposition processing, a patterning processing, an impurity doping processing, a high-temperature treatment, and the like, the pixel units, peripheral circuits including the data line driving circuit 101, the scanning line driving circuit 104, and the like, the external circuit connecting terminals 102, the relay wiring lines including the image signal lines 115, and the like are formed (Step S10a).

At this time, the plurality of pixel units are arranged in the image display region 10a. The scanning line driving circuit 104 for driving the pixel units through the scanning lines 3a is disposed along at least one second side adjacent to the first side (lower side in FIG. 3) of the TFT array substrate 10 in the peripheral region around the image display region 10a. The data line driving circuit 101 for driving the pixel units through the data lines 6a is disposed along the first side in the peripheral region. The plurality of external circuit connecting terminals 102 are arranged along the first side in the region on the extended portion 10e of the peripheral region.

On the other hand, before and after or in parallel with the formation process of the TFT array substrate 10, on the counter substrate 20, through a process including various kinds of processing, such as a film deposition processing, a patterning processing, an impurity doping processing, a high temperature treatment, and the like, the counter electrode 21 and the like are formed (Step S10b).

Subsequently, through a bonding process, the liquid crystal layer 50 is interposed between the TFT array substrate 10 and the counter substrate 20. At this time, the TFT array substrate 10 is formed to have the extended portion 10e from the counter substrate 20 on the first side in plan view (Step S20).

In particular, in the formation process (Step S10a), the first wiring line portions L1 of the image signal lines 115 are at least partially formed within the sealing region 52a. In addition, in the formation process (Step S10a), since the surface of the TFT array substrate 10 is planarized, in the subsequent bonding process (Step S20), a possibility that the image signal lines 115 or the lead wiring line portions 116 wired within the sealing region 52a are disconnected or short-circuited is reduced.

Therefore, in the method of manufacturing a liquid crystal device according to this embodiment, the liquid crystal device according to the first or second embodiment described above can be easily manufactured. Moreover, in the method of manufacturing a liquid crystal device of this embodiment, various configurations corresponding to various configurations of the liquid crystal device according to the first and second embodiments can be adopted.

Electronic Apparatus

Next, a case in which the liquid crystal device as the above-described electro-optical device is applied to various electronic apparatuses will be described.

Figure 11:
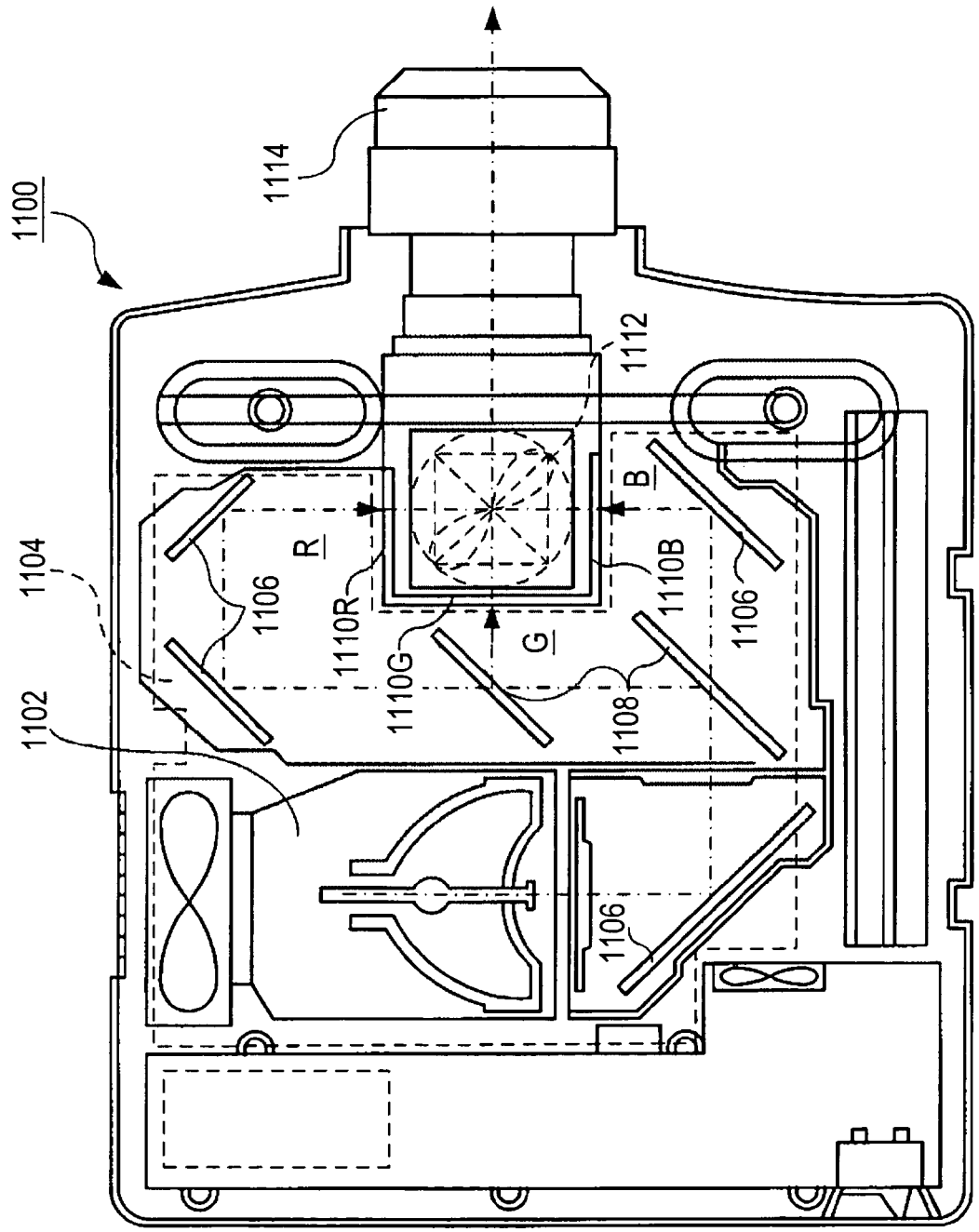
FIG. 11 is a plan view showing the configuration of a projector as an example of an electronic apparatus, to which an electro-optical device is applied.

First, a projector which uses the liquid crystal device as a light valve will be described. FIG. 11 is a plan view showing a configuration example of a projector. As shown in FIG. 11, inside the projector 1100, a lamp unit 1102 having a white light source, such as a halogen lamp or the like, is provided. Projection light emitted from the lamp unit 1102 is separated into three primary colors of R, G, and B by four mirrors 1106 and two dichroic mirrors 1108 disposed in a light guide 1104, and the light components of three primary colors of R, G, and B are correspondingly incident on liquid crystal panels 1110R, 1110B, and 1110G serving as light valves.

The configurations of the liquid crystal panels 1110R, 1110B, and 1110G are the same as that of the above-described liquid crystal device, and are individually driven by signals of the three primary colors of R, G, and B to be supplied from an image signal processing circuit. And then, the light components modulated by the liquid crystal panels are incident on a dichroic prism 1112 from three directions. In the dichroic prism 1112, the R and B light components are refracted by 90 degrees, and the G light component goes straight. Therefore, the images of the respective colors are synthesized, and then a color image is projected onto a screen or the like through a projection lens 1114.

Here, paying attention to display images by the individual liquid crystal panels 1110R, 1110B, and 1110G, the display image by the liquid crystal panel 1110G needs to be horizontally inverted with respect to the display images by the liquid crystal panels 1110R and 1110B.

Moreover, the light components corresponding to the respective primary colors of R, G, and B are correspondingly incident on the liquid crystal panels 1110R, 1110B, and 1110G by the dichroic mirrors 1108, and thus color filters do not need to be provided.

Figure 12:
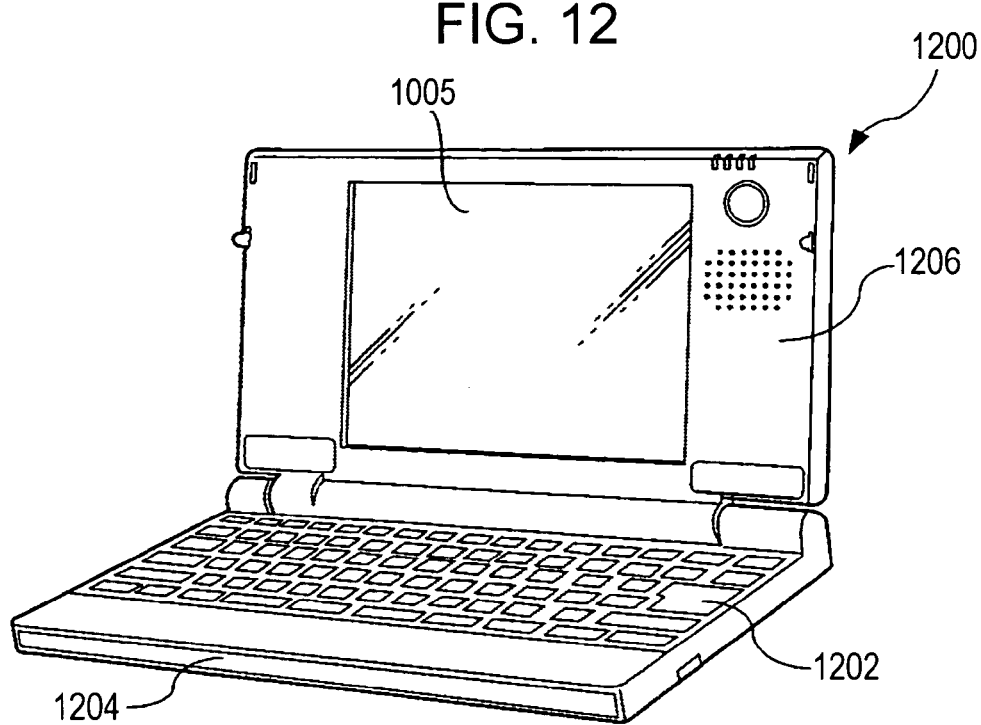
FIG. 12 is a perspective view showing the configuration of a personal computer as an example of an electronic apparatus, to which an electro-optical device is applied.

Next, an example in which the liquid crystal device is applied to a mobile-type personal computer will be described. FIG. 12 is a perspective view showing the configuration of the personal computer. Referring to FIG. 12, the computer 1200 has a main body portion 1204 having a keyboard 1202, and a liquid crystal display unit 1206. The liquid crystal display unit 1206 is configured by adding a backlight to the rear surface of the liquid crystal device 1005 described above.

Figure 13:
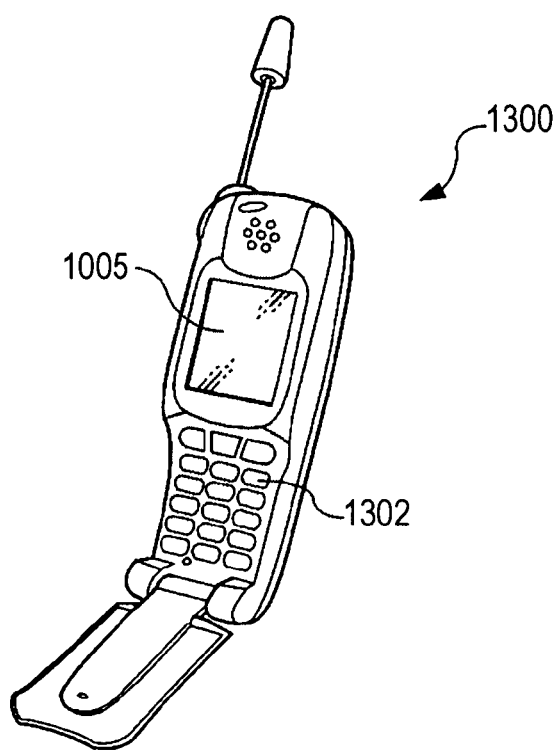
FIG. 13 is a perspective view showing the configuration of a cellular phone as an example of an electronic apparatus, to which an electro-optical device is applied.

In addition, an example in which the liquid crystal device is applied to a cellular phone will be described. FIG. 13 is a perspective view showing the configuration of the cellular phone. Referring to FIG. 13, the cellular phone 1300 has a plurality of operating buttons 1302, and a reflective liquid crystal device 1005. As for the reflective liquid crystal device 1005, if necessary, a front light is provided on the front surface thereof.

Moreover, in addition to the electronic apparatuses described with reference to FIGS. 11 to 13, a liquid crystal television, a viewfinder-type or monitor-direct-view-type video tape recorder, a car navigation device, a pager, an electronic organizer, an electronic calculator, a workstation, a video phone, a POS terminal, a device having a touch panel, and the like can be exemplified. Of course, the invention can be applied to these electronic apparatuses.

Further, the invention can be applied to a reflective liquid crystal device (LCOS) in which elements are formed on a silicon substrate, a plasma display (PDP), a field emission display (FED, SED, or the like), an organic electroluminescent (EL) display, and the like, in addition to the liquid crystal device described in the above-described embodiments.

The invention is not limited to the above-described embodiments, but various modifications can be made within the scope without departing from the subject matter or spirit of the invention, which can be read on the appended claims and the specification. Further, an electro-optical device, an electronic apparatus having such an electro-optical device, and a method of manufacturing such an electro-optical device, which accompany such modifications, still fall within the technical scope of the invention.

What is claimed is:

1. An electro-optical device comprising:
    first and second substrates that are bonded to each other, the first substrate having an extended portion extended from the second substrate on a first side thereof in plan view;
    a plurality of pixel units that are arranged in a pixel region on the first substrate and individually have pixel electrodes;
    a data line driving circuit that is disposed along the first side in a peripheral region around the pixel region so as to supply an image signal to the pixel units;
    a plurality of external circuit connecting terminals that are arranged along the first side in a region of the peripheral region on the extended portion;
    an image signal line that is relayed around the data line driving circuit from the plurality of external circuit connecting terminals,
    the image signal line having a first wiring line portion that extends between the data line driving circuit and the pixel region in a direction following the first side; and
    a sealant that bonds the first and second substrates to each other in a sealing region around the pixel region,
    wherein the first wiring line portion is at least partially wired within the sealing region,
    a counter electrode that is formed on the second substrate to commonly face the pixel electrodes individually provided in the plurality of pixel units and is cut in a region facing the first wiring line portion,
    a vertical connecting terminal that is provided on the first substrate so as to supply a counter electrode potential to the counter electrode, the counter electrode extending to a region facing the vertical connecting terminal aside the cut portion; and
    a vertical connecting material that electrically connects the vertical connecting terminal and the extended portion of the counter electrode to each other.

2. The electro-optical device according to claim 1,
    wherein the image signal is a plurality of image signals subjected to serial-to-parallel conversion, and the first wiring line portion is a plurality of first wiring line portions for supplying the plurality of image signals, and
    the plurality of first wiring line portions are individually disposed within the sealing region.

3. The electro-optical device according to claim 1,
    wherein the image signal is a plurality of image signals subjected to serial-to-parallel conversion, and the first wiring line portion is a plurality of first wiring line portions for supplying the plurality of image signals, and
    the plurality of first wiring line portions are disposed such that parts thereof have the same area within the same area.

4. The electro-optical device according to claim 1,
    wherein the image signal line has a lead wiring line portion that is led from the first wiring line portion toward the pixel region, and
    the lead wiring line portion is at least partially disposed within the sealing region.

5. The electro-optical device according to claim 1,
    wherein the image signal is a plurality of image signals subjected to serial-to-parallel conversion, and the first wiring line portion is a plurality of first wiring line portions for supplying the plurality of image signals, and
    the counter electrode is cut so as not to partially face the regions facing the plurality of first wiring line portions and such that parts thereof facing the plurality of first wiring line portions have the same area.

6. The electro-optical device according to claim 1,
    wherein gap materials are mixed in the sealant so as to define a gap between the first and second substrates, and
    a planarization treatment is performed on a film disposed above the first wiring line portion on the first substrate.

7. An electronic apparatus comprising the electro-optical device according to claim 1.

8. The electro-optical device according to claim 6, further comprising:
    a sampling circuit that is provided on the first substrate to sample the image signal supplied through the image signal line according to a sampling circuit driving signal to be supplied from the data line driving circuit and to supply the sampled image signal to data lines,
    wherein the data line driving circuit is disposed in a region of the peripheral region farther from the pixel region than from the sealing region, and
    the sampling circuit is disposed in a region of the peripheral region closer to the pixel region than to the sealing region.

* * * * *

UNITED STATES PATENT AND TRADEMARK OFFICE
CERTIFICATE OF CORRECTION

PATENT NO.        : 7,615,810 B2                              Page 1 of 1
APPLICATION NO.   : 11/348489
DATED             : November 10, 2009
INVENTOR(S)       : Masao Murade It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 616 days.

Signed and Sealed this

Nineteenth Day of October, 2010

David J. Kappos
*Director of the United States Patent and Trademark Office*